Oct. 4, 1966  D. F. DOWNEY ETAL  3,277,231
CONDUCTOR-CARRYING FLEXIBLE CONDUIT
Filed Jan. 17, 1964  2 Sheets-Sheet 1
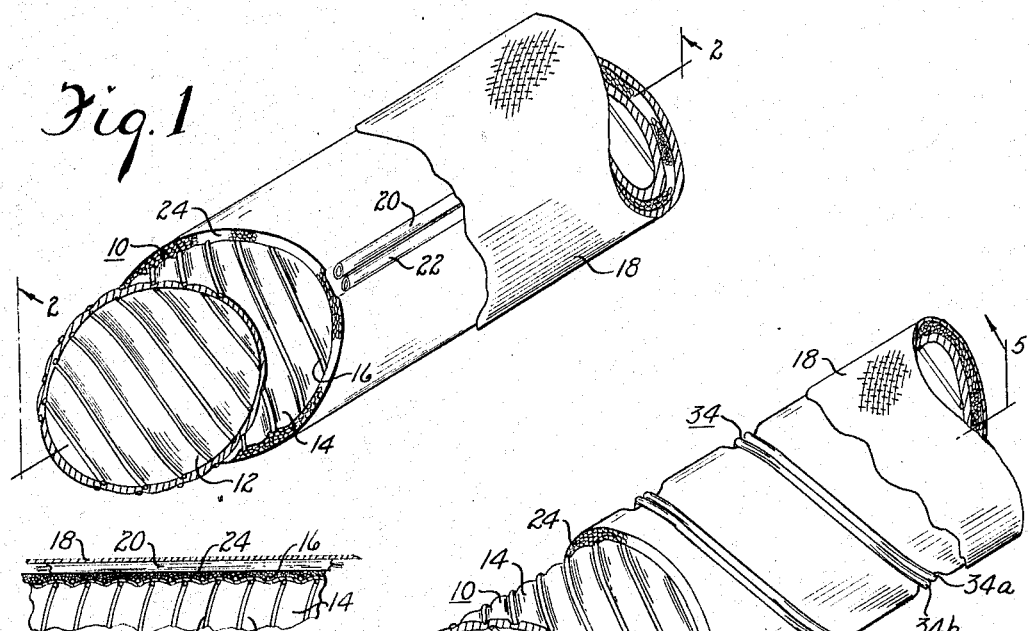
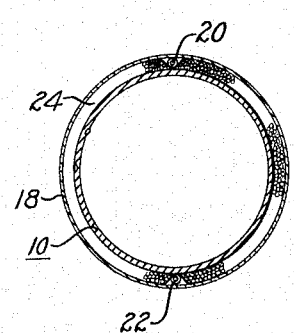
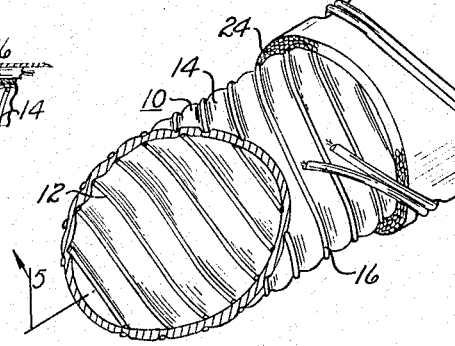
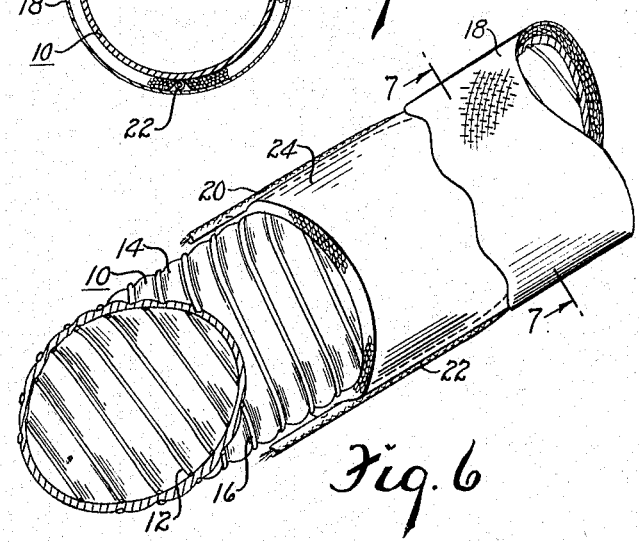
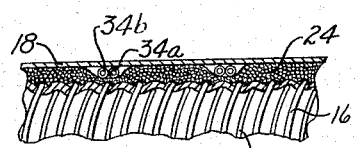
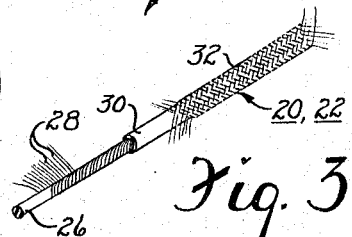
INVENTORS
DAVID F. DOWNEY
JOHN T. FERRARIS
BY
*Thomas C. Betts*
THEIR ATTORNEY

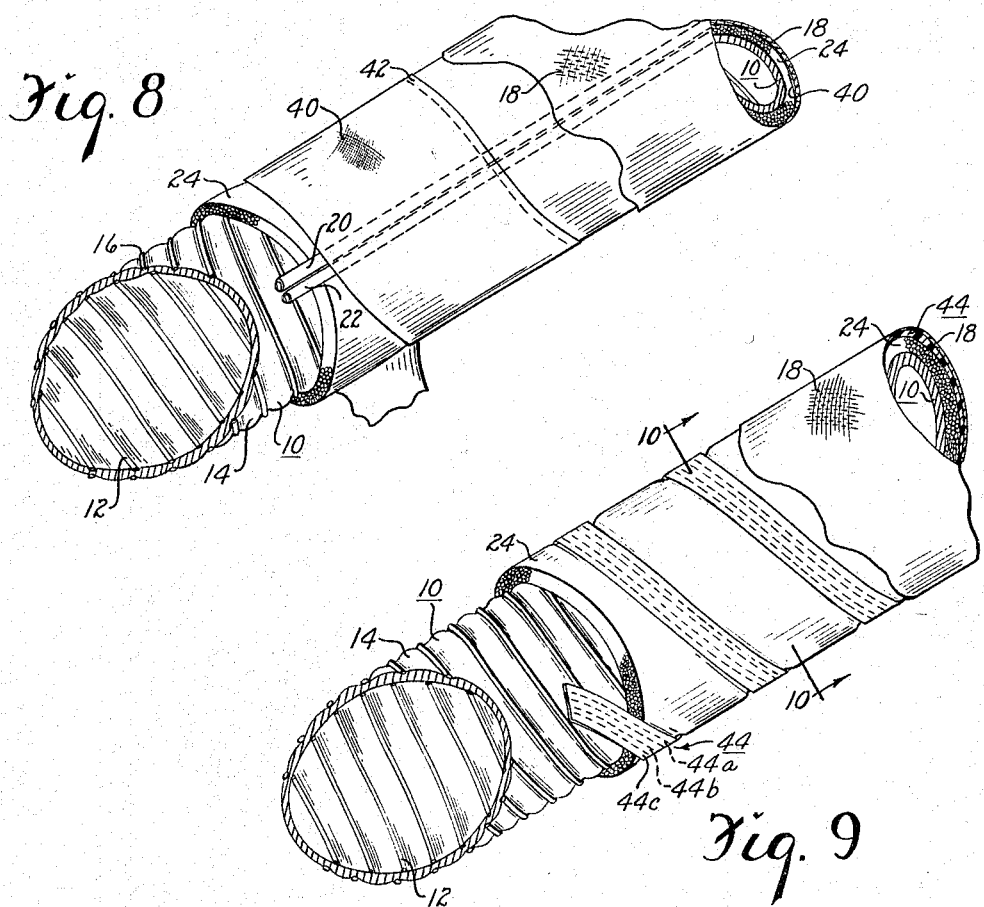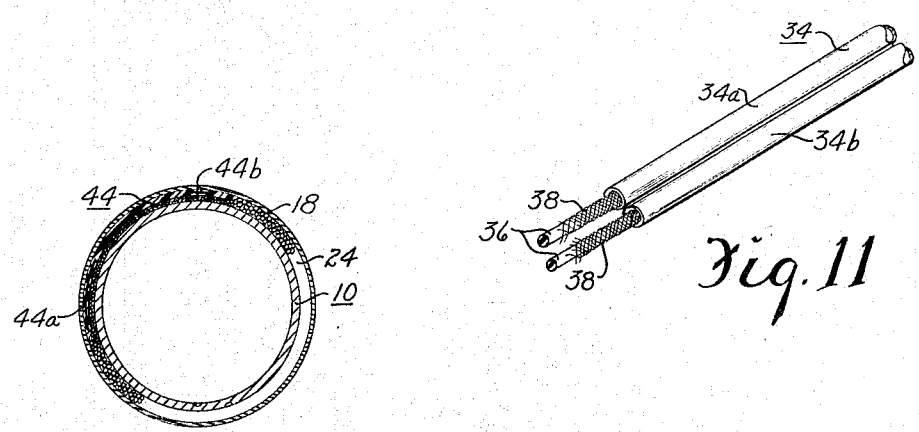

United States Patent Office 3,277,231
Patented Oct. 4, 1966

3,277,231
CONDUCTOR-CARRYING FLEXIBLE CONDUIT
David F. Downey and John T. Ferraris, Stamford, Conn., assignors to Electrolux Corporation, Old Greenwich, Conn., a corporation of Delaware
Filed Jan. 17, 1964, Ser. No. 338,497
6 Claims. (Cl. 174—47)

This invention pertains, in general, to conductor-carrying flexible hose or conduit; and, in particular, to a hose or conduit having a carcass covered with a body of yieldable elastic material which enables electrical conductors, situated between the elastic material and an outermost protective sheath or cover, to become countersunk or nested therein.

Conductor-carrying flexible hose is useful for many purposes. For example, a conductor-carrying suction hose is highly useful in simultaneously vacuuming and brushing carpets, or the like. Such a suction hose performs two functions. In addition to applying suction, created in the tank unit of a vacuum cleaner, to a suction nozzle, the hose conducts electricity from the tank unit to a motor which, together with a brush rotated by the motor, is located in the suction nozzle.

The conventional kind of vacuum cleaner suction hose, which has been widely used for a long time and is abundantly available, includes a corrugated tubular hose carcass which has a helical reinforcing spring situated therein. This carcass is covered with a protective sheath or cover; for example, a stretchable braided sheath. Heretofore, attempts to incorporate an electrical conductor, or conductors, in this kind of suction hose have not proved entirely satisfactory, especially when the conductors had a relatively large cross-sectional area. When the conductors were placed between the corrugated carcass and the sheath, the conductors caused an unsightly bulging of the sheath so that the once relatively smooth surface of the tubular hose became distorted. That is, the cross-section of the hose which was once circular now had a bulge included in its periphery. Also, the bulge, transversing from one end of the hose to the other, had an undulating appearance because the conductors lying on the corrugated surface of the tubular carcass conformed to the contour of these corrugations. In addition to being unsightly, the hose became more difficult to handle and manipulate during the cleaning operation.

Other kinds of conductor carrying flexible hose and conduits have been proposed more recently. For example, in one kind, an elastomeric tube includes a helical reinforcing spring and helical electrical conductors embedded therein. However, such a hose is expensive to manufacture. Moreover, enormous conductor lengths, many times the length of the hose, are required because the helical conductors have a pitch which is about the same as that of the helical reinforcing spring. With such conductor lengths, the voltage drop is often intolerable.

One object of the present invention is to provide a new and improved conductor-carrying flexible hose, or conduit.

Another object is to provide a conductor-carrying flexible hose, or conduit, wherein electrical conductors may be incorporated, easily, in the aforesaid long-used conventional kind of suction hose, as well as in other kinds of hose.

Another object of the present invention is to provide a conductor-carrying flexible hose, or conduit, wherein the outer cover, or sheath, has a relatively smooth tubular appearance without the bulging heretofore encountered due to the inclusion of the electrical conductors, especially those conductors having a relatively large cross-sectional dimension.

Another object of the present invention is to provide a conductor-carrying flexible hose wherein the length of the conductors used need be only equal to, or just a little longer than, the length of the hose.

Briefly, in accordance with one embodiment of the present invention there is provided a hose wherein a body of yieldable elastic material covers a hose carcass. Conductor means are situated between the yieldable elastic body and a sheath which encompasses the conductor means as well as the yieldable elastic body. As a result, the elastic body yields to permit the conductor means to become countersunk or nested in the surface thereof.

One feature of the hose of the present invention is that a body of yieldable elastic material is used for countersinking or nesting the conductors which are forced against the elastic material.

Another feature of the hose of the present invention is that stretchable elastic conductors, which may be pretensioned, may be arranged in countersunk or nested relation with the yieldable elastic material to permit easy bending of the hose, even at relatively small bending radii.

Another feature of the hose of the present invention is that conventional electrical conductors may be employed, instead of the aforementioned stretchable elastic conductors. These conventional conductors may be helically wound around the yieldable elastic body in countersunk or nested relation therewith; being helically wound the countersunk conventional conductors permit relatively easy bending of the hose.

Another feature of the hose of the present invention is that relatively flat, tape-like or strip-like conductor elements may be countersunk or nested in the yieldable elastic-body which encompasses the carcass of the hose. As a result the smooth outer surface of the protective sheath of the hose is further assured.

Another feature of the hose of the present invention is that an elastic tape may be applied over the conductors and the surface of the yieldable elastic body to force and maintain the conductors in countersunk or nested relation in the yielded elastic body.

Further objects, features and advantages of the present invention will be apparent from the following description considered in connection with the accompanying drawings which form part of this application and of which:

FIG. 1 is a perspective view, partly cut away, of a longitudinal section of hose in accordance with one embodiment of the present invention;

FIG. 2 is a sectional view of the hose of FIG. 1 as viewed along the section line 2—2 of FIG. 1;

FIG. 3 is a perspective view, partly cut away, of a length of stretchable elastic conductor which may be used in fabricating various hoses in accordance with the present invention;

FIG. 4 is a perspective view, partly cut away, of a longitudinal section of hose according to another embodiment of the present invention;

FIG. 5 is a sectional view of the hose of FIG. 4 as viewed along the section line 5—5 of FIG. 4;

FIG. 6 is a perspective view, partly cut away, of a longitudinal section of hose according to an additional embodiment of the present invention;

FIG. 7 is a sectional view of the hose of FIG. 6 as viewed along the section line 7—7 of FIG. 6;

FIG. 8 is a perspective view, partly cut away, of a longitudinal section of a hose according to a still further embodiment of the invention;

FIG. 9 is a perspective view, partly cut away, of a longitudinal section of a hose according to another embodiment of the invention;

FIG. 10 is a sectional view of the hose of FIG. 9 as viewed along the section line 10—10 of FIG. 9; and, FIG. 11 is a perspective view, partly cut away, of a length of stretchable, elastic, two-wire conductor which may be used in fabricating various hoses in accordance with the present invention.

In the different embodiments of the invention shown in the figures the same reference numbers are used in identifying the same parts which are common to the respective embodiments.

A first embodiment of the hose of the present invention is shown in FIGS. 1 and 2. As shown, there is a corrugated tubular hose carcass designated, generally, by the reference number 10. This carcass 10 is comprised of a helical reinforcing spring 12, a tube-like wrapping 14 and a helically-wound cord 16. The wrapping 14 is usually formed from a rubberized sheeting material. For example, rubberized nylon friction sheeting is suitable for the purpose. This sheeting is wrapped around the helical spring 12. The helical spring 12 may be formed from a steel wire or the like. The cord 16, which may be made of jute or like material, is tightly wound as a helix around the outside of the wrapping 14 so that the turns of the cord 16 are situated between adjacent turns of the helical spring 12. By virtue of the tightly wound cord 16 on the outside of the wrapping 14 and the helical reinforcing spring 12 situated within the wrapping 14 the wrapping assumes the form of a corrugated tube as shown. The helically wound cord 16 holds the wrapping 14 in place as the hose carcass is cured or vulcanized. During the curing or vulcanization the turns of the helical spring 12 become bonded to the inner wall surface of the wrapping 14. After the curing or vulcanization step the cord 16 may be removed if desired; but, usually, it is not removed.

Such a carcass construction is well known and has been used for a long time. In the conventional vacuum cleaner hose which does not incorporate electrical conductors, a protective outer cover, such as the sheath 18 is applied over the carcass 10. This sheath 18 may be in the form of a braided covering. With the sheath 18 applied a relatively smooth uncorrugated outer surface is provided.

However, since the insulated conductors 20 and 22 are to be incorporated there is provided a tubular body 24 of a yieldable elastic material. This body 24 of elastic material may be wrapped around or extruded on the carcass 10. Suitable materials for forming the tubular body 24 are foamed or cellular polyurethane, foamed or cellular vinyl plastic, sponge rubber, or the like. As shown, the tubular body 24 encompasses the hose carcass 10. The conductors 20 and 22, as shown in FIGS. 1 and 2, are arranged on the tubular body 24 so that they are parallel to the longitudinal central axis of the carcass 10. Afterward, a braided sheath 18, or protective outer cover, is applied so that it covers the conductors 20, 22 and the tubular body 24. The braided sheath 18 may be applied in the well known way by a braiding machine. FIGS. 1 and 2 show how the tubular elastic body 24 yields to conform to the contuor of the corrugated surface of the carcass 10, as well as to the surface contour of the conductors 20 and 22. These conductors are countersunk or nested in the yielded portions of the outer surface of the elastic body 24 due to the force of the sheath 18 covering the conductors and the elastic body 24. As a result, the conductor-carrying hose in accordance with the invention has an outer surface covering or sheath which is smooth and uncorrugated. Also, the hose's outer covering or sheath has no bulge therein.

The conductors 20 and 22 which are used in the embodiment shown in FIGS. 1 and 2 are preferably stretchable, elastic conductors, like that shown in FIG. 3. Advantageously, the use of stretchable, elastic conductors permits the hose to be bent through relatively small radii of curvature. Stretchable, elastic conductors, or extensible conductors as they are often called, are known. See, for example, U.S. Patent 2,013,211 of K. Herkenberg, issued September 3, 1935, wherein one such kind of conductor is disclosed. In the extensible conductor construction according to FIG. 3, there is provided an elastic core 26 about which the conductive strands 28 are helically wound. Encompassing the core 26 and the helically wound strands 28 is the elastic insulating tube 30. Fitted over the tube 30 is a braided sheath 32. A stretchable, elastic rubber is a suitable material for forming the core 26 and the tube 30. Copper is a suitable material for the strands 28. Nylon, silk or cotton fibres may be used in forming the braided sheath 32. The conductor illustrated at FIG. 3 can be extended lengthwise to a substantial degree.

In the hose of FIGS. 1 and 2, it is preferred that the extensible conductors be prestretched a certain amount. If the hose is bent and the conductors are on the outside of the bend they will stretch to a greater length. If, however, they are on the inside of the bend, they will tend to contract and return to their initial, unstretched length. The opposite ends of the prestretched conductors, at the respective ends of the hose, may be securely held against the body 24 by suitable means, such as cord fasteners or the like.

Another embodiment of the present invention is illustrated at FIGS. 4 and 5. The hose there illustrated is similar to that shown at FIGS. 1 and 2, except that a conductor element designated generally by the reference number 34 is tightly wound as a helix about the periphery of the yieldable elastic tubular body 24. As shown, the conductor element 34 has a relatively large pitch dimension, much larger than the pitch of the reinforcing wire 12 or the cord 16. Although a conventional two-wire conductor may be used in the embodiment of FIGS. 4 and 5 it is preferred that the conductor element be a stretchable elastic two-wire conductor, such as that shown at FIG. 11. As shown at FIG. 11 two elastic cores 36 are provided. These cores 36 may be fashioned from rubber or the like. Over each core 36 the conductive strands 38, which may be fashioned from copper, are arranged; these conductive strands 38 being in a basket weave arrangement. Encompassing the conductive strands 38 and the elastic cores 36 are the two elastic tubes 34a and 34b which may be fashioned from rubber or the like. These elastic tubes 34a and 34b are tangentially joined to provide a unitary two-wire conductive element 34. The extensible conductor shown at FIG. 11 can be stretched longitudinally to a substantial degree. FIGS. 4 and 5 show how the tightly wound conductor element 34 is in a countersunk or nested attitude in the surface of the yieldable elastic body 24. The forces maintaining the conductor element 34 in countersunk relation are those due to the tight winding of the conductor element and to the force exerted thereagainst by the braided sheath 18.

Another embodiment of the invention is illustrated at FIGS. 6 and 7. The hose shown in these figures is similar to that shown in FIGS. 1 and 2, except that the conductors 20 and 22 are arranged on opposite sides of the tubular elastic body 24. The conductors 20 and 22 are maintained in a countersunk or nested relation in the surface of the body 24 due to the force exerted thereagainst by the braided sheath 18.

In the hose of FIGS. 6 and 7, it is also preferred that the extensible conductors be prestretched a certain amount and secured at their opposite ends in the manner hereinbefore suggested. If the hose is bent such that one conductor is on the outside of the bend and the other conductor is on the inside of the bend, the one conductor will become further stretched while the other conductor will contract in attempting to return to its unstretched length.

Another embodiment of the invention is illustrated at FIG. 8. The hose there shown is similar to that shown in FIGS. 1 and 2, except that additional means are used to force the conductors 20 and 22 into countersunk or nested relation in the surface of the yieldable elastic body 24. The additional means employed is a stretchable elastic tape 40 which is tightly wound in a helical fashion about the tubular body 24. Only the overlapping edge portions 42 of the tape are bonded. The tape 40 may be fashioned from a rubberized mesh woven from nylon fibers or the like. After winding the tape 40 about the tubular body 24 the rubberized mesh is vulcanized thereby establishing the bond between the overlapping edge portions 42. Advantageously, the rubberized nylon mesh material may be stretched to a substantial degree. As a result the hose may be bent easily through relatively small radii of curvature. As indicated at FIG. 8 the conductors 20 and 22 are countersunk or nested in the surface of the tubular body 24 primarily due to the radial force exerted on the conductors by the tape 40.

In the hose construction of FIG. 8 it is preferred that the extensible conductors be prestretched in the same manner, and for the same reason, as hereinbefore described with reference to the hose of FIGS. 1 and 2.

Another embodiment of the invention is illustrated at FIGS. 9 and 10. The hose illustrated there is similar to that shown in FIGS. 4 and 5, except that a tape-like or strip-like conductor 44 is tightly wound as a helix about the tubular body 24. As shown, the conductor 44 is comprised of two longitudinal conductive foils 44a and 44b which are embedded in spaced-apart relation in a strip-like insulating matrix 44c. The conductive foils may be fashioned from copper or the like and the insulating matrix may be fashioned from polyethylene or the like. As indicated in FIGS. 9 and 10 the conductor element 44 is maintained in countersunk or nested relation in the surface of the elastic body 24 due to the fact that it is tightly wound thereabout and also due to the force of the braided sheath 18 thereon.

In the foregoing embodiments the opposite ends of the conductors may be connected to a plug and receptacle, respectively, in any suitable manner; such as, for example, that disclosed in U.S. Patent No. 3,082,289, granted March 19, 1963.

Furthermore, although the invention has been described as being embodied in a conventional braid-covered, corrugated, hose carcass including a helical reinforcing spring, it is to be understood that the invention may be embodied in other kinds of hose which employ a sheathed or covered carcass construction. Moreover, it is to be understood that more or less than two electrical conductors may be incorporated in the hose according to the present invention.

While there are shown and described several more or less specific embodiments of the invention, it is to be understood that this has been done for purposes of illustration, only, and that the scope of the invention is to be determined from the appended claims.

What is claimed is:
1. In a sheath-covered hose of the type described the combination of:
 a hose carcass comprising a tubular body of flexible material having an inner tubular wall which forms a passage therethrough,
 a helical spring member disposed coaxially of and within said flexible tubular body to effect reinforcement thereof,
 a tubular sleeve of radially yieldable elastic material covering the outer surface of said tubular hose carcass,
 flexible conductor means carried by and extending along the length of said tubular elastic sleeve,
 said elastic tubular sleeve having a thickness greater than said flexible conductor means,
 said flexible conductor means having nesting contact within a groove-like depression in the outer peripheral surface of said elastic tubular sleeve and disposed flush with the outer peripheral surface thereof,
 and a flexible tubular sheath disposed in intimate surrounding relation to said tubular sleeve of yieldable elastic material to overlie and secure said flexible conductor means within the groove-like depression flush with the outer surface of said elastic tubular sleeve.

2. A sheath-covered hose as defined in claim 1 in which said flexible conductor means is disposed helically around said sleeve.

3. A sheath-covered hose as defined in claim 1 in which said flexible conductor means is extensible.

4. A sheath-covered hose as defined in claim 2 in which said flexible conductor means is extensible and helically arranged on said tubular sleeve of radially yieldable elastic material.

5. A sheath-covered hose as defined in claim 1 including a stretchable elastic tape extending helically around said tubular sleeve of radially yieldable elastic material and said flexible conductor means and positioned underneath said sheath.

6. A sheath-covered hose as defined in claim 1 wherein said conductor means is comprised of a flat, strip-like body of insulation having at least one longitudinal strip-like conductor embedded therein, said strip-like body being helically wound about said yieldable elastic body.

References Cited by the Examiner

UNITED STATES PATENTS

| | | | |
|---|---|---|---|
| 2,002,739 | 5/1935 | Herkenberg | 174—69 |
| 2,072,690 | 3/1937 | Smellie. | |
| 2,597,806 | 5/1952 | Martin | 138—131 X |
| 2,865,978 | 12/1958 | Modrey | 174—47 X |
| 2,895,001 | 7/1959 | Noyes et al. | 174—47 |
| 2,917,568 | 12/1959 | Moorman et al. | 156—143 X |

FOREIGN PATENTS

| | | |
|---|---|---|
| 755,244 | 9/1933 | France. |
| 588,858 | 6/1947 | Great Britain. |

LEWIS H. MYERS, *Primary Examiner.*

JOHN F. BURNS, ROBERT K. SCHAEFER,
*Examiners.*

J. F. RUGGIERO, *Assistant Examiner.*